(12) United States Patent
Kamei et al.

(10) Patent No.: US 6,925,228 B2
(45) Date of Patent: Aug. 2, 2005

(54) OPTICAL WAVEGUIDE CIRCUIT

(75) Inventors: Shin Kamei, Zama (JP); Motohaya Ishii, Atsugi (JP); Akihiro Takagi, Mito (JP); Takeshi Kitagawa, Yokohama (JP)

(73) Assignee: Nippon Telegraph and Telephone, Tokyo (JP)

( * ) Notice: Subject to any disclaimer, the term of this patent is extended or adjusted under 35 U.S.C. 154(b) by 213 days.

(21) Appl. No.: 10/320,189

(22) Filed: Dec. 16, 2002

(65) Prior Publication Data

US 2003/0118286 A1 Jun. 26, 2003

(30) Foreign Application Priority Data

Dec. 21, 2001 (JP) .................................. 2001-390503

(51) Int. Cl.⁷ .............................. G02B 6/34; G02B 6/26
(52) U.S. Cl. ........................................ 385/37; 385/43
(58) Field of Search .................................. 385/37, 43

(56) References Cited

U.S. PATENT DOCUMENTS 5,033,812 A * 7/1991 Yoshida et al. ............... 385/37
6,148,129 A * 11/2000 Pan et al. ...................... 385/42
6,668,117 B2 * 12/2003 Hasegawa et al. ............ 385/37
6,697,552 B2 * 2/2004 McGreer et al. .............. 385/37

OTHER PUBLICATIONS

K. Aretz and H Bulow, Reduction of Crosstalk and Losses of Interesecting Waveguide, Apr. 13, 1989, Electronic Letters vol. 25 No. 11 May 25, 1989 pp. 730–731.*

H. Takahashi et al., *Arrayed–Waveguide Grating for Wavelength Division Multi/Demultiplexer with Nanometer Resolution*, Electron. Lett., vol. 26, No. 2, pp. 87–88, 1990.

K. Okamoto et al., *32X32 Arrayed–Waveguide Grating Multiplexer with Uniform Loss and Cyclic Frequency Characteristics*, Electron. Lett., vol. 33, No. 22, pp. 1865–1866, 1997.

Akimasa Kaneko et al., *Design and Applications of Silica–Based Planar Lightwave Circuits*, IEEE Journal of Selected topics in Quantum Electronics, vol. 5, No. 4, Sep./Oct. 1999.

* cited by examiner

*Primary Examiner*—John D. Lee
*Assistant Examiner*—Tina M Lin
(74) *Attorney, Agent, or Firm*—Workman Nydegger

(57) ABSTRACT

A practical optical waveguide circuit is provided which includes many intersections but is low loss. The width of a waveguide core is $w_1$ at input and output terminal sections and $w_2$ at an intersecting section, where $w_2 > w_1$. The core width of the intersecting section is made different from that of the input and output terminal sections, or the core height of the intersecting section is made different from that of the input and output terminal sections. The core width is smoothly varied between the intersecting section and the input and output terminal sections by a tapered section. When the number of the waveguides intersecting with the intersecting section is 100, the intersection loss is 5.8 dB for the conventional device where $w_2 = w_1 = 5$ μm, but is 1.8 dB when $w_2 = 12$ μm, thereby being able to reduce the intersection loss sharply.

34 Claims, 13 Drawing Sheets

| INPUT PORT \ OUTPUT PORT | 1 | 2 | 3 | ---- | N-1 | N |
|---|---|---|---|---|---|---|
| 1 | $\lambda_1$ | $\lambda_2$ | $\lambda_3$ | ---- | $\lambda_{N-1}$ | $\lambda_N$ |
| 2 | $\lambda_2$ | $\lambda_3$ | $\lambda_4$ | ---- | $\lambda_N$ | $\lambda_1$ |
| 3 | $\lambda_3$ | $\lambda_4$ | $\lambda_5$ | ---- | $\lambda_1$ | $\lambda_2$ |
| ⋮ | ⋮ | ⋮ | ⋮ | | ⋮ | ⋮ |
| N-1 | $\lambda_{N-1}$ | $\lambda_N$ | $\lambda_4$ | ---- | $\lambda_{N-3}$ | $\lambda_{N-2}$ |
| N | $\lambda_N$ | $\lambda_1$ | $\lambda_2$ | ---- | $\lambda_{N-2}$ | $\lambda_{N-1}$ |

FIG.1

OPTICAL WAVEGUIDE CIRCUIT

This application claims priority from Japanese Patent Application No. 2001-390503 filed Dec. 21, 2001, which is incorporated hereinto by reference.

BACKGROUND OF THE INVENTION

1. Field of the Invention

The present invention relates to an optical waveguide circuit, and more particularly to an optical waveguide circuit constructed by combining optical waveguides composed of a core and a cladding.

2. Description of the Related Art

A wavelength division multiplexing (WDM) transmission system, which assigns a plurality of optical signals to different wavelengths and transmits them through a single optical fiber, can greatly increase the capacity of the transmission. To configure an optical transmission network with the optical WDM systems, a wavelength multi/demultiplexer is necessary which multiplexes optical signals with different wavelengths into a single optical fiber, or demultiplexes the optical signals, which are multiplexed into a single optical fiber, to the original wavelengths.

In particular, an N×N cyclic wavelength multi/demultiplexer that has N input ports and N output ports, and has a demultiplexing characteristic with cyclic input/output relationship can have various applications in the optical WDM system.

FIG. 1 shows an example of the demultiplexing characteristics of the N×N cyclic wavelength multi/demultiplexer. Although it includes $N^2$ paths between N input ports and N output ports, it can establish all the paths independently by only N wavelengths $\lambda_1$–$\lambda_N$. The characteristics enable an N×N wavelength router function that establishes full mesh links among N nodes, or an N×N optical switch function by combining with N tunable wavelength light sources.

On the other hand, intensive research and development about planar lightwave circuits, which are constructed using silica-based glass waveguides formed on a silicon substrate, have been progressed. The planar lightwave circuit includes an arrayed-waveguide grating (AWG) that implements the wavelength multi/demultiplexing. The detail of the AWG is described in H. Takahashi et al., "Arrayed-Waveguide Grating for Wavelength Division Multi/Demultiplexer With Nanometer Resolution", Electron. Lett., Vol. 26, No. 2, pp. 87–88, 1990.

FIG. 2 shows a circuit configuration of an AWG. It includes on a Si substrate 1, input waveguides 2, a first slab waveguide 3, arrayed-waveguides 4, a second slab waveguide 5 and output waveguides 6. The N×N cyclic wavelength multi/demultiplexer described before is implemented by a planar lightwave circuit composed of a combination of the AWG described above and optical couplers.

FIG. 3 is a diagram showing a configuration of a conventional N×N cyclic wavelength multi/demultiplexer using an AWG and optical couplers. In FIG. 3, the reference numeral 11 designates N input ports, 12 designates N output ports, 13 designates an AWG having a plurality of input and output waveguides, 14 designates a plurality of 2×1 optical couplers, and 15 designates a plurality of connecting waveguides that connect the AWG 13 to the optical couplers 14.

FIG. 3 shows an example in which the number of the input and output ports are four each, the multiplexed number of the wavelengths is four, and the number of each of the input and output waveguides of the AWG 13 is eight. Four quadplexed optical signals A1, A2, A3 and A4, B1, B2, B3 and B4, C1, C2, C3 and C4, and D1, D2, D3 and D4 are incident onto the AWG 13 through the four input ports 11 connected to the four input waveguides among the eight of the AWG 13.

Here, the alphabetical letters indicate the positions of the input ports, and the numbers indicate the wavelengths. Accordingly, the optical signals with the same alphabetical letter are inputted into the same input port, and the optical signals with the same number have the same wavelength. Therefore 16 different optical signals are transmitted here at four wavelengths. The input optical signals are wavelength demultiplexed to the output ports according to the characteristics of the AWG 13, and are supplied to the connecting waveguides 15 in such a manner that the optical signals supplied to each input waveguide are output from the consecutive output ports in accordance with their wavelengths.

Then, the 2×1 optical couplers 14 couple the waveguides of the connecting waveguides 15 corresponding to the output waveguides (2) and (6), (3) and (7), and (4) and (8) of the AWG 13, respectively. As a result, the N output ports 12 connected to the outputs of the 2×1 optical couplers 14 implement the demultiplexing characteristics of the cyclic input and output relationships as described in connection with FIG. 1.

To thus configuring the N×N cyclic wavelength multi/demultiplexer as a single planar lightwave circuit using the AWG and optical couplers, the connecting waveguides 15 that connect the AWG 13 with the optical couplers 14 must intersect with other connecting waveguides (N−1) times at the maximum. In the example of FIG. 3 where N=4, the waveguide corresponding to the output waveguide (4) or (5) of the AWG 13 intersects with the other three waveguides.

In addition, the waveguide corresponding to the output waveguide (3) or (6) of the AWG 13, and the waveguide corresponding to the output waveguide (2) or (7) intersect with other waveguides twice and once, respectively, and the waveguide corresponding to the output waveguide (8) does not intersect with other waveguides. Thus, the number of intersections with the other waveguides varies depending on the connecting waveguides.

As described above by way of example of the N×N cyclic wavelength multi/demultiplexer, the optical waveguide circuit like the foregoing planar lightwave circuit must have intersections of the waveguides to implement a more complicated waveguide layout, or to interconnect a plurality of component circuits in combination.

The waveguide intersections, however, cause a loss. Accordingly, a complicated waveguide layout or interconnections of a lot of component circuits in combination, which include many intersections, can increase the loss of the circuit because of cumulative losses, thereby degrading the circuit characteristics, and making the practical use of the circuit difficult.

In particular, configuring the N×N cyclic wavelength multi/demultiplexer as a single planar lightwave circuit brings about (N−1) waveguide intersections at the maximum for the circuit scale N. In addition, the respective connecting waveguides can have different numbers of the intersections. Accordingly, the loss increase of the circuit is inevitable when realizing a large-scale circuit. Furthermore, difference of the input and output ports and differences of wavelength of the optical signal passing through the circuit can cause great loss difference.

Therefore the conventional cyclic wavelength multi/demultiplexer has a problem in that it is difficult to realize a circuit which has a large circuit scale in terms of the number of the multiplexed wavelengths or that of the input and output ports, with achieving a good loss characteristics.

SUMMARY OF THE INVENTION

The present invention is implemented to solve the foregoing problems. It is therefore an object of the present invention to provide a practical optical waveguide circuit, an N×N cyclic wavelength multi/demultiplexer in particular, which has a low loss in spite of a lot of intersections, and has a large circuit scale and good loss characteristics.

To accomplish the object, according to the present invention, there is provided an optical waveguide circuit including a first optical waveguide composed of a cladding and a core, and a set of second optical waveguides consisting of a plurality of optical waveguides, which are each composed of a cladding and a core, and intersect with the first optical waveguide successively, the first optical waveguide comprising: an intersecting section at which the first optical waveguide intersect with the set of the second optical waveguides; a tapered section at which a core width is varied before and after the intersecting section; and an input terminal section and an output terminal section for inputting and outputting lightwave, wherein at least one of a core width and a core height of the intersecting section differs from corresponding one of a core width and a core height of the input and output terminal sections, and wherein a core width of the tapered section varies smoothly between the intersecting section and the input and output sections.

Here, the intersecting section in the first optical waveguide may consists of a straight waveguide.

The individual waveguides included in the set of the second optical waveguides intersect with the first optical waveguide at a fixed interval.

According to a second aspect of the present invention, there is provided an optical waveguide circuit composed of optical waveguides each consisting of a cladding and a core and including an arrayed-waveguide grating having a given number of input optical waveguides and a plurality of output optical waveguides; first optical waveguides each connected to one of the plurality of output optical waveguides; and a set of second optical waveguides consisting of a plurality of optical waveguides, which are each composed of a cladding and a core, and intersect the first optical waveguides successively, each of the first optical waveguides comprising: an intersecting section at which each of the first optical waveguides intersect the set of the second optical waveguides; a tapered section at which a core width is varied before and after the intersecting section; and an input terminal section and an output terminal section for inputting and outputting an optical wave, wherein at least one of a core width and a core height of the intersecting section differs from corresponding one of a core width and a core height of the input and output terminal sections, and wherein at least one of core width and core height of the tapered section varies smoothly between the intersecting section and the input and output sections.

Here, the claddings and the cores may be composed of silica-based glass.

The arrayed-waveguide grating may consist of an N×2N arrayed-waveguide grating having N input optical waveguides and 2N output waveguides, where N is an integer greater than one; the first optical waveguides may have their one end connected to Lth waveguides of the output waveguides of the N×2N arrayed-waveguide grating, where L=2, 3, . . . , and N; and individual waveguides of the set of the second optical waveguides may have their one ends connected to (N+1)th to (N+L−1)th waveguides of the output waveguides of the N×2N arrayed-waveguide grating, wherein the optical waveguide circuit may further comprise N optical couplers, an Mth optical coupler of which has its inputs connected to an Mth and (M+N)th waveguides of the output waveguides of the N×2N arrayed-waveguide grating to couple the pair of the waveguides, where M=1, 2, . . . , and N, and wherein the input optical waveguides of the N×2N arrayed-waveguide grating, may constitute input ports, and outputs of the couplers may constitute output ports.

The arrayed-waveguide grating may consist of an N×2N arrayed-waveguide grating having N input waveguides and 2N output waveguides, where N is an integer greater than one; the first optical waveguides may have their one end connected to Lth waveguides of the output waveguides of the N×2N arrayed-waveguide grating, where L=N+1, N+2, . . . , and 2N−1; and individual waveguides of the set of the second optical waveguides may have their one ends connected to (L−N+1)th to Nth waveguides of the output waveguides of the N×2N arrayed-waveguide grating, wherein the optical waveguide circuit may further comprise N optical couplers, an Mth optical coupler of which has its inputs connected to an Mth and (M+N)th waveguides of the output waveguides of the N×2N arrayed-waveguide grating to couple the pair of the waveguides, where M=1, 2, . . . , and N, and wherein the input waveguides of the N×2N arrayed-waveguide grating may constitute input ports, and outputs of the couplers may constitute output ports.

Here, a free spectral range of the N×2N arrayed-waveguide grating may be set such that a maximum optical loss of the first optical waveguides originating with the intersections with the set of the second optical waveguides becomes substantially equal to a maximum loss difference among the output waveguides of the N×2N arrayed-waveguide grating.

The first optical waveguides and the set of the second optical waveguides may be arranged such that the first optical waveguides and at least part of the waveguides included in the set of the second optical waveguides intersect with each other perpendicularly.

As described above, the present invention provides an optical waveguide circuit including a first optical waveguide composed of a cladding and a core, and a set of second optical waveguides consisting of a plurality of optical waveguides, which are each composed of a cladding and a core, and intersect with the first optical waveguide successively, the first optical waveguide comprising: an intersecting section at which the first optical waveguide intersect with the set of the second optical waveguides; a tapered section at which a core width is varied before and after the intersecting section; and an input terminal section and an output terminal section for inputting and outputting lightwave, wherein at least one of a core width and a core height of the intersecting section differs from corresponding one of a core width and a core height of the input and output terminal sections, and wherein a core width of the tapered section varies smoothly between the intersecting section and the input and output sections. Thus, it can reduce the intersection loss in the optical waveguide circuit including intersections, and implement a practical optical waveguide circuit with a loss lower than the one. In particular, it can realize an N×N cyclic wavelength multi/demultiplexer that has a greater circuit scale in terms of the multiplexed number of the wavelengths and the number of the input and output ports, and has more satisfactory loss characteristics, that is, a lower loss and higher consistency in the loss, than the conventional device.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a table showing an example of demultiplexing characteristics of an N×N cyclic wavelength optical multi/demultiplexer;

DETAILED DESCRIPTION OF PREFERRED EMBODIMENTS

Figure 2:
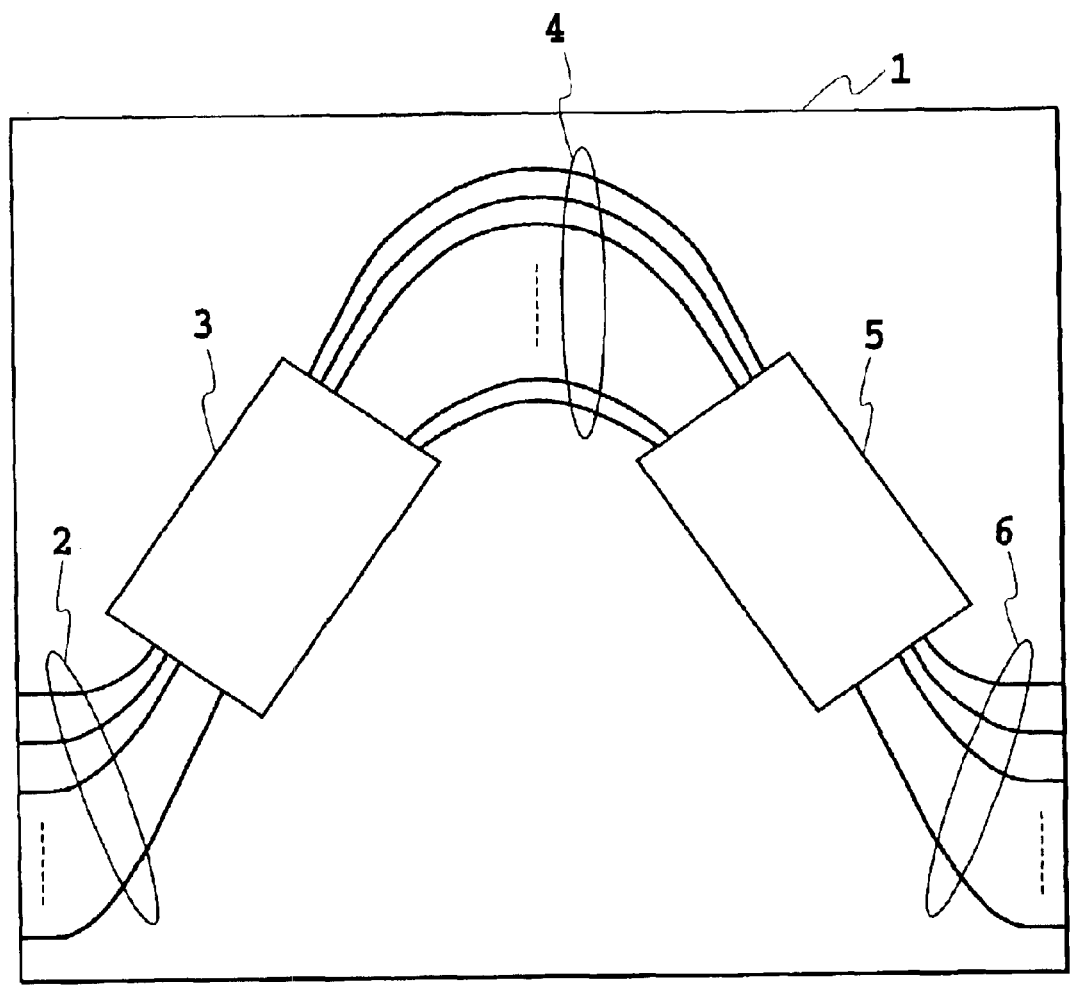
FIG. 2 is a diagram showing a circuit configuration of an AWG.
Figure 3:
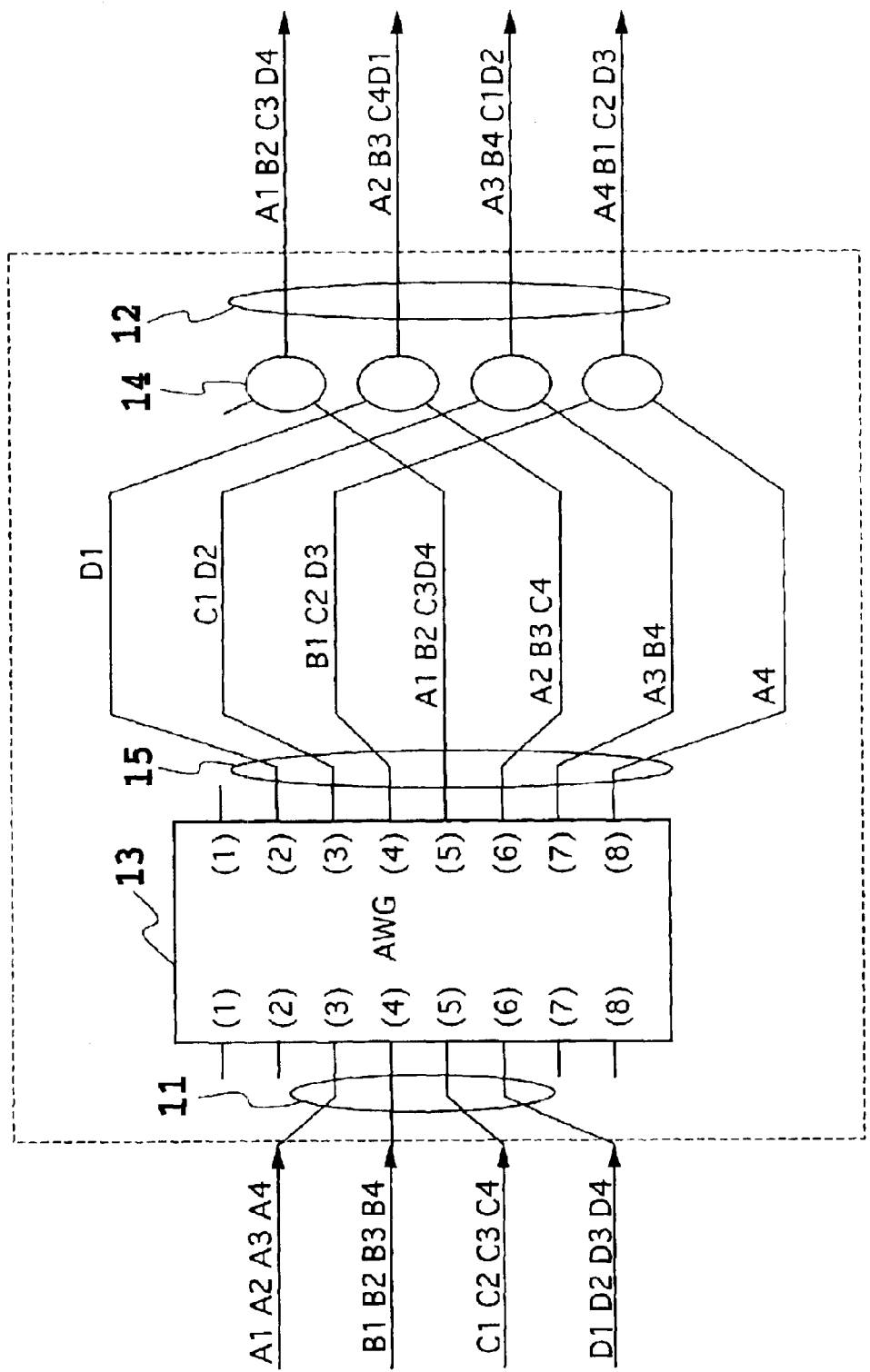
FIG. 3 is a diagram showing a configuration of a conventional N×N cyclic wavelength multi/demultiplexer utilizing an AWG and optical couplers.
Figure 4:
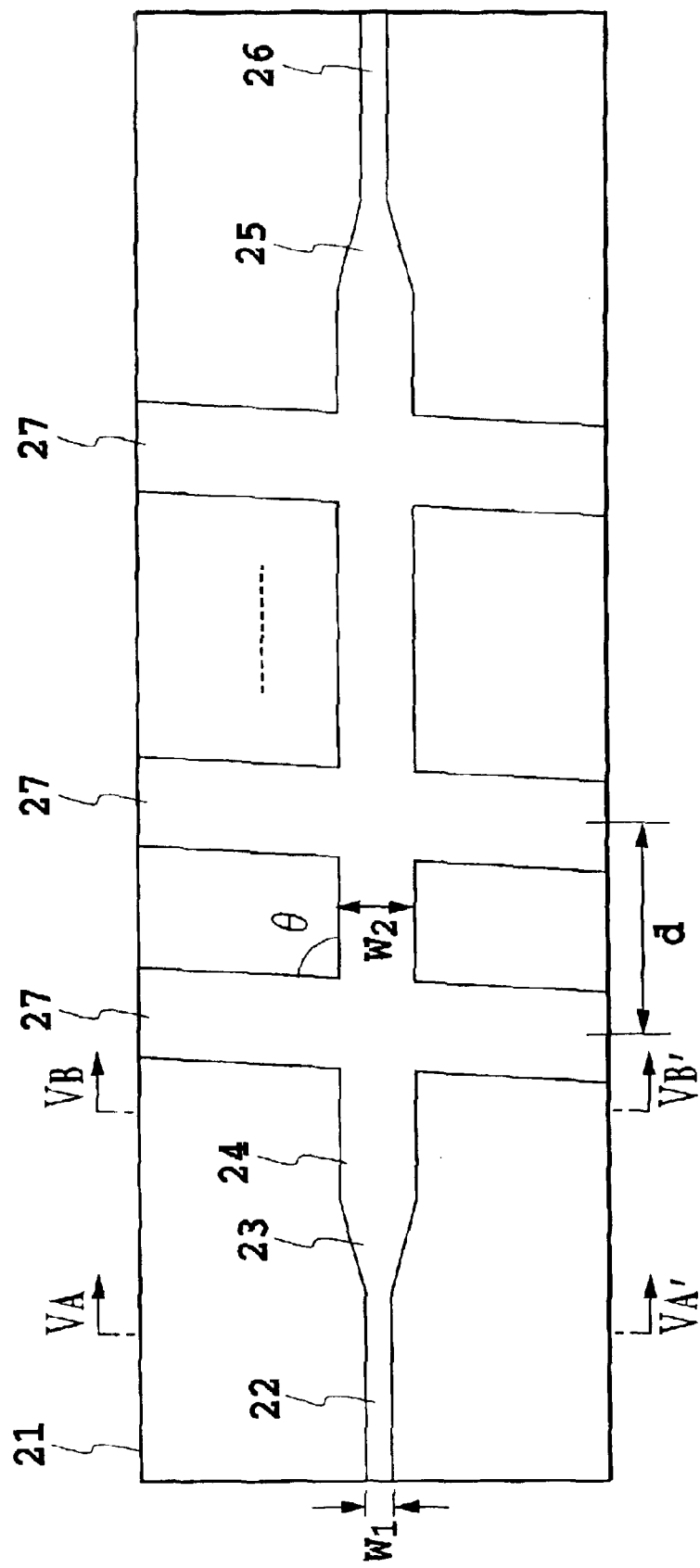
FIG. 4 is a plan view of a first embodiment of the optical waveguide circuit in accordance with the present invention.
Figure 5B:
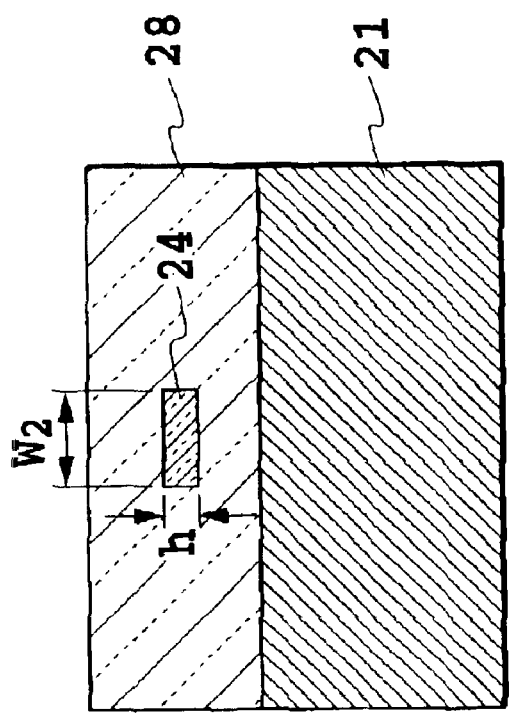
FIG. 5B is a cross-sectional view of the first embodiment of the optical waveguide circuit in accordance with the present invention taken along the line VB–VB' of FIG. 4.
Figure 5A:
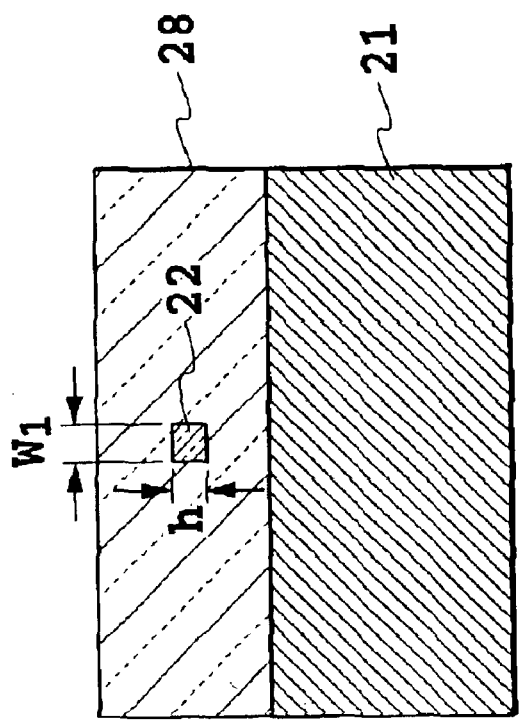
FIG. 5A is a cross-sectional view of the first embodiment of the optical waveguide circuit in accordance with the present invention taken along the line VA–VA' of FIG. 4.

The embodiments of the present invention will now be described with reference to the accompanying drawings.
[Embodiment 1]
FIGS. 4, 5A and 5B are views showing the first embodiment of the optical waveguide circuit in accordance with the present invention: FIG. 4 is a plan view of the optical waveguide circuit; FIG. 5A is a cross-sectional view taken along the line VA–VA' in FIG. 4; and FIG. 5B is a cross-sectional view taken along the line VB–VB' in FIG. 4. In these figures, the reference numeral 21 designates a Si substrate, and 28 designates a cladding. The reference numerals 22–27 each designate a shape of a waveguide core. The reference numeral 22 designates an input terminal section, 23 designates a tapered section, 24 designates an intersecting section, 25 designates a tapered section, and 26 designates an output terminal section. The reference numerals 27 each designate a waveguide intersecting with the intersecting section 24.

Assume that the waveguide core has a width $w_1$ at the input terminal section 22 and output terminal section 26, and $w_2$ at the intersecting section 24, and that the waveguide core has a height h. The present embodiment is characterized by $w_2 > w_1$. The waveguides 27 at the intersecting section 24 has a fixed intersection pitch d, and an intersecting angle θ.

It is assumed in the present embodiment that the refractive index difference between the waveguide core and the cladding is 1.5%, and that lightwave with an wavelength in 1.5 µm band travels through the waveguide. The core size $w_1 \times h$ at the input and output terminal sections 22 and 26 is set at 5 µm×5 µm to establish the single mode of the traveling lightwave.

Figure 6:
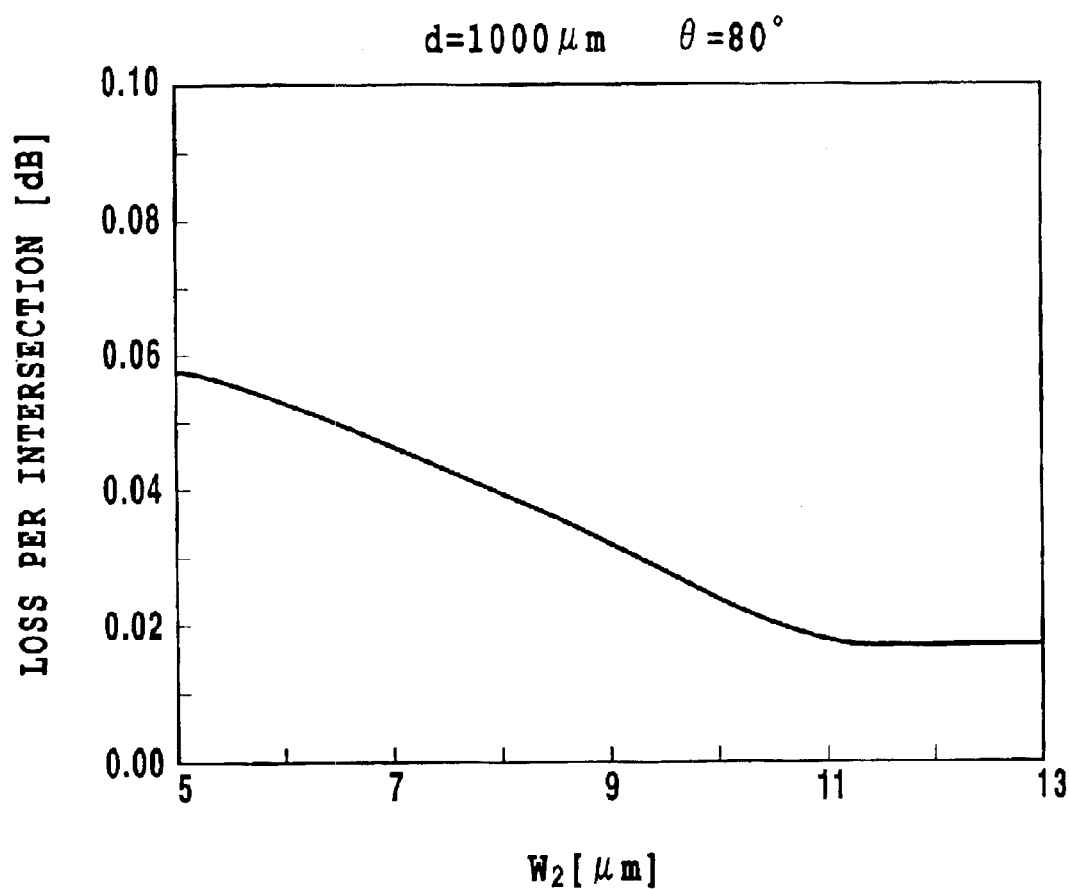
FIG. 6 is a graph illustrating the waveguide core width dependence of the intersection loss of the waveguide.

FIG. 6 is a graph illustrating the optical intensity loss per intersection as a function of $w_2$ when the waveguide intersection spacing d=1000 µm and the intersecting angle θ=80°. It shows that the loss because of the intersection can be reduced by placing $w_2 > w_1$ rather than by placing $w_2 = w_1 = 5$ µm. The present embodiment adopts $w_2 = 12$ µm.

Figure 7:
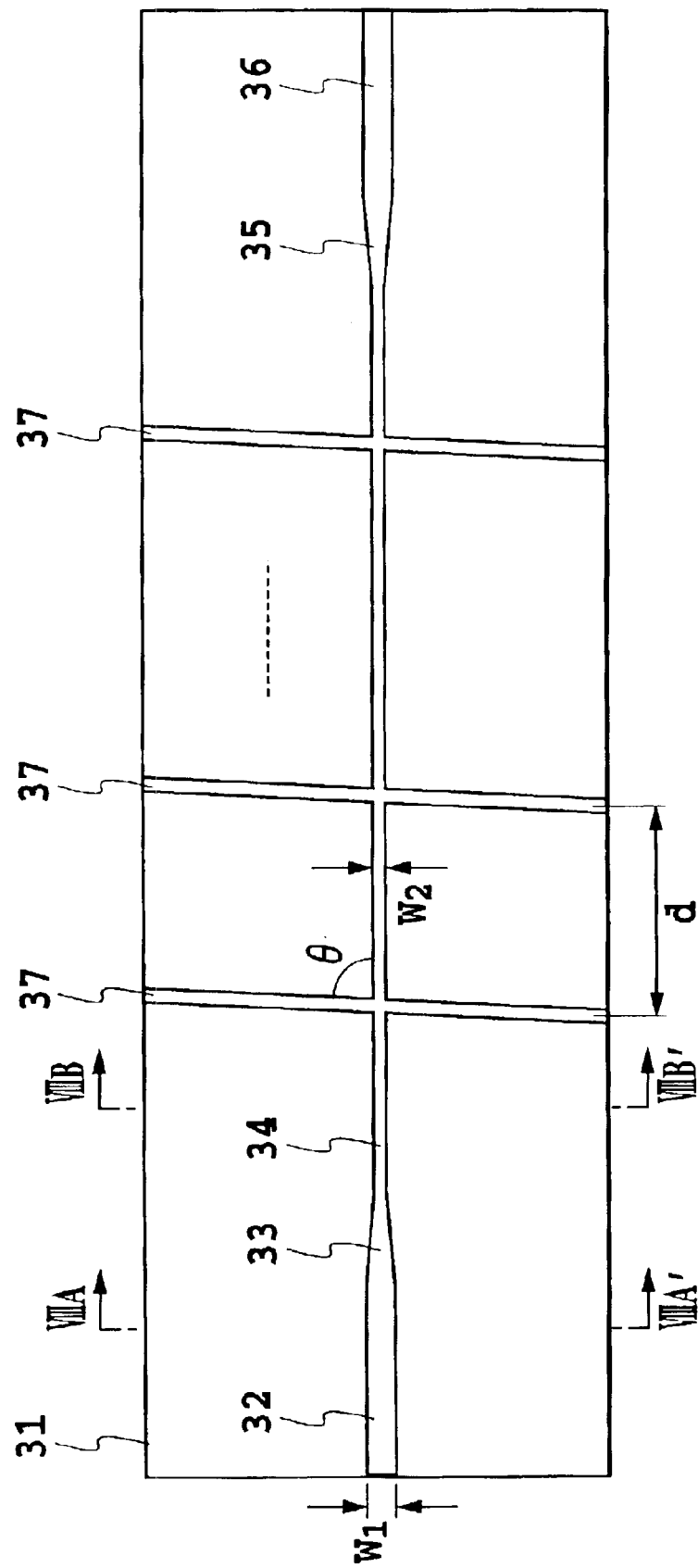
FIG. 7 is a plan view showing a second embodiment of the optical waveguide circuit in accordance with the present invention.
Figure 8B:
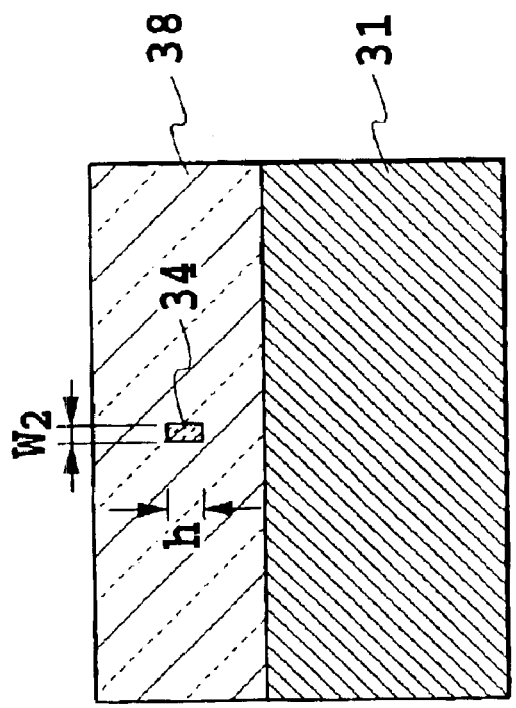
FIG. 8B is a cross-sectional view of the second embodiment of the optical waveguide circuit in accordance with the present invention taken along the line VIIIB–VIIIB' in FIG. 7.
Figure 8A:
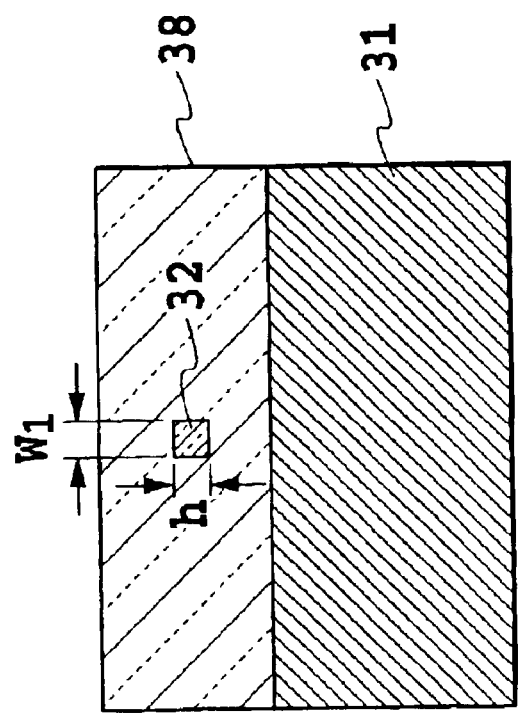
FIG. 8A is a cross-sectional view of the second embodiment of the optical waveguide circuit in accordance with the present invention taken along the line VIIIA–VIIIA' in FIG. 7.

When the number of the waveguides 27 intersecting with the intersecting section 24 is 100, the intersection loss is 5.8 dB when $w_2 = w_1 = 5$ µm as in the conventional example. In contrast, the intersection loss reduces to 1.8 dB when $w_2 = 12$ µm as in the present embodiment. Thus the present embodiment can markedly reduce the intersection loss.
[Embodiment 2]
FIGS. 7, 8A and 8B are views showing the second embodiment of the optical waveguide circuit in accordance with the present invention: FIG. 7 is a plan view of the optical waveguide circuit; FIG. 8A is a cross-sectional view taken along the line VIIIA–VIIIA' in FIG. 7; and FIG. 8B is a cross-sectional view taken along the line VIIIB–VIIIB' in FIG. 7. In these figures, the reference numeral 31 designates a Si substrate, and 38 designates a cladding. The reference numerals 32–37 each designate a shape of a waveguide core. The reference numeral 32 designates an input terminal section, 33 designates a tapered section, 34 designates an intersecting section, 35 designates a tapered section, and 36 designates an output terminal section. The reference numerals 37 each designate a waveguide intersecting with the intersecting section 34.

Assume that the waveguide core has a width $w_1$ at the input terminal section 32 and output terminal section 36, and $w_2$ at the intersecting section 34, and that the waveguide core has a height h. The present embodiment is characterized by $w_2 < w_1$. The waveguides 37 at the intersecting section 34 has a fixed intersection pitch d, and an intersecting angle θ.

It is assumed in the present embodiment that the refractive index difference between the waveguide core and the cladding is 1.5%, and that lightwave with an wavelength in 1.5 µm band travels through the waveguide. The core size of the input and output terminal sections 32 and 36 is set at $w_1 \times h = 5$ µm×5 µm to establish the single mode of the traveling lightwave.

Figure 9:
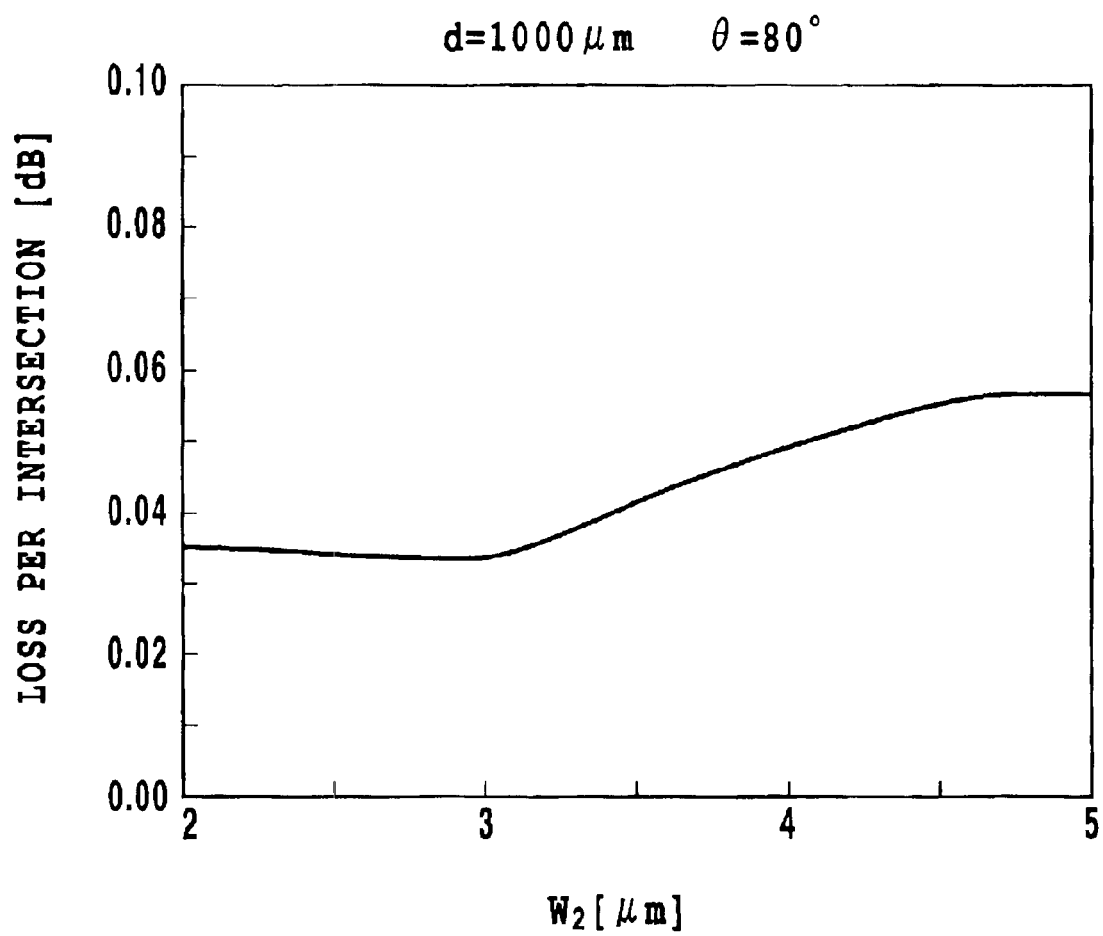
FIG. 9 is a graph illustrating the waveguide core width dependence of the intersection loss of the waveguide.

FIG. 9 is a graph illustrating the optical intensity loss per intersection as a function of $w_2$ when the waveguide intersection spacing d=1000 μm and the intersecting angle θ=80°. It illustrates that the loss because of the intersection can be reduced by placing $w_2<w_1$ rather than by placing $w_2=w_1=5$ μm. The present embodiment adopts $w_2=3$ μm.

When the number of the waveguides 37 intersecting with the intersecting section 34 is 100, the intersection loss is 5.8 dB when $w_2=w_1=5$ μm as in the conventional example. In contrast, the intersection loss reduces to 3.5 dB when $w_2=3$ μm as in the present embodiment. Thus the present embodiment can markedly reduce the intersection loss.

[Embodiment 3]

Figure 10:
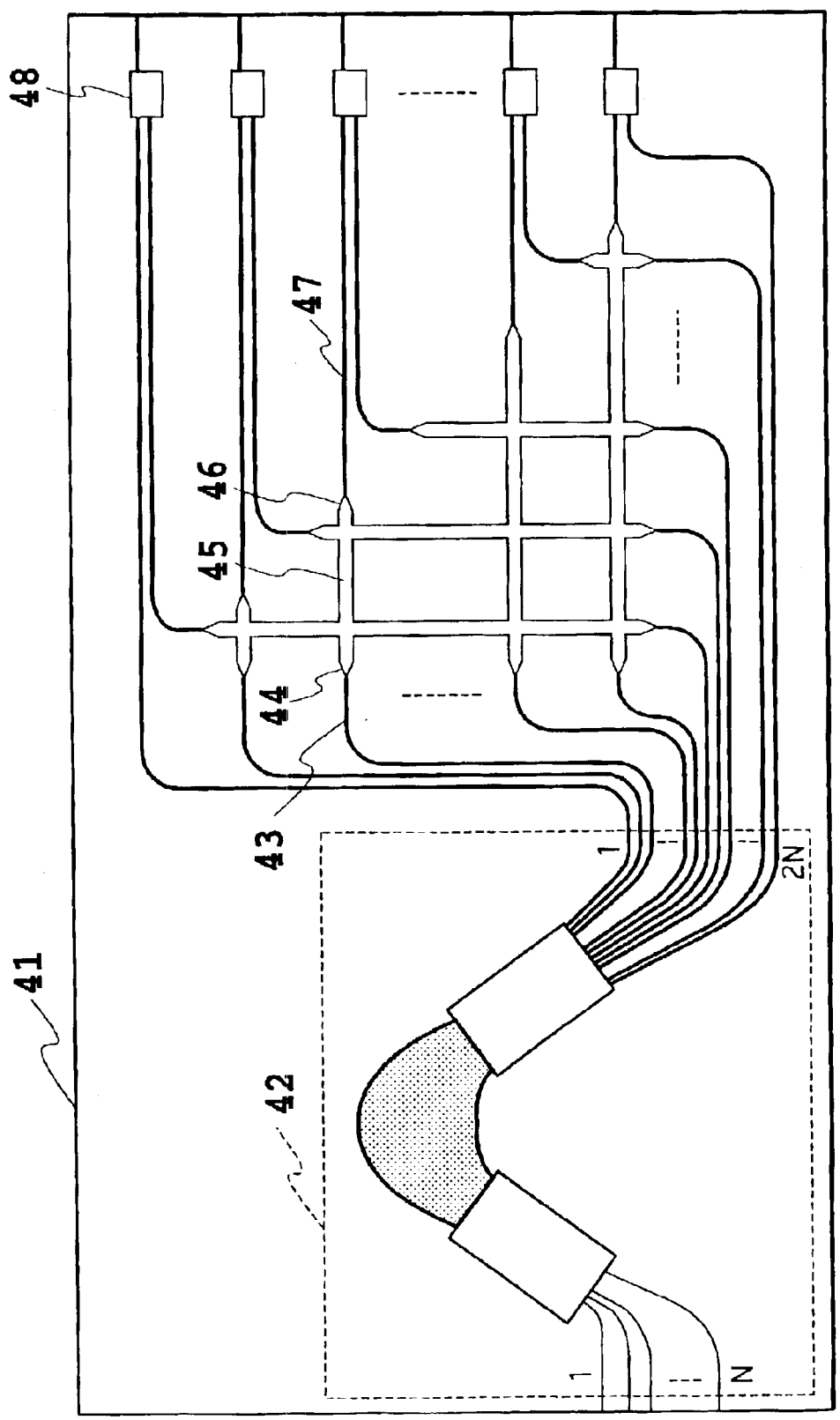
FIG. 10 is a diagram showing a configuration of a third embodiment of the optical waveguide circuit in accordance with the present invention.

FIG. 10 is a plan view showing a third embodiment of the optical waveguide circuit in accordance with the present invention, in which the optical waveguide circuit in accordance with the present invention is applied to an N×N wavelength optical multi/demultiplexer. In FIG. 10, the reference numeral 41 designates a Si substrate, and 42 designates an N×2N AWG with N input waveguides and 2N output waveguides. The N input waveguides constitute the input ports of the N×N wavelength optical multi/demultiplexer. Reference numerals 43–47 designate one of 2N connecting waveguides including intersections. The reference numeral 43 designates an input terminal section, 44 designates an tapered section, 45 designates an intersecting section, 46 designates an tapered section, and 47 designates an output terminal section. Reference numerals 48 each designate one of N optical couplers for coupling two optical inputs. Each optical coupler consists of a multi-mode interferometer in the present embodiment. The N output waveguides of the N optical couplers 48 constitute the output ports of the N×N wavelength optical multi/demultiplexer.

In the present embodiment, it is assumed that the refractive index difference between the waveguide core and the cladding is 1.5%, and that the lightwaves in the 1.55 μm wavelength band are multi/demultiplexed. The core size of the input and output waveguides and arrayed-waveguides of the N×2N AWG42, that of the input and output terminal sections 43 and 47 of the connecting waveguides and that of the input and output waveguides of the optical coupler 48 are set at 5 μm×5 μm to establish the single mode of the traveling lightwave. The core width of the connection waveguides at the intersecting sections 45 is set at 12 μm, wider than that of the input and output terminal sections. In addition, the intersection spacing with other connecting waveguides are placed at 1000 μm.

Figure 11:
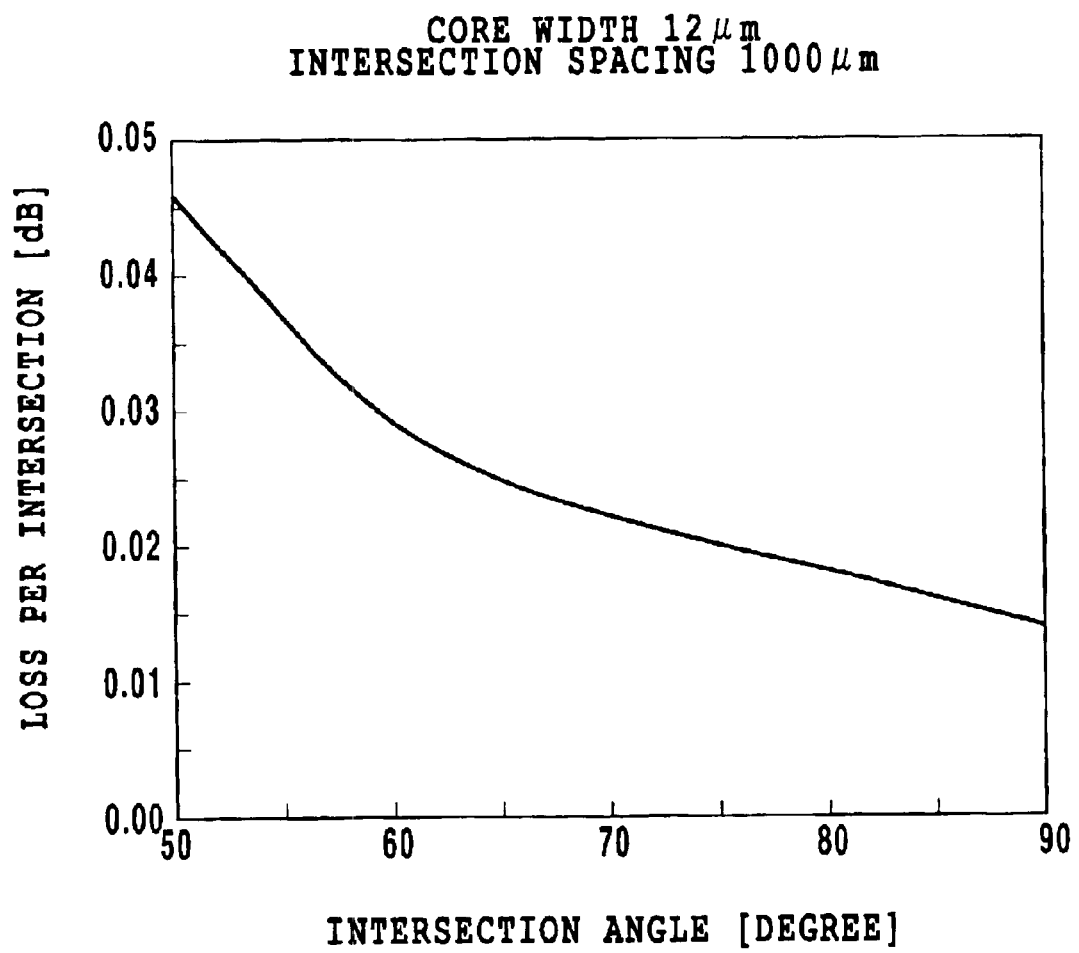
FIG. 11 is a graph illustrating intersecting angle dependence of the intersection loss of the waveguide.

FIG. 11 is a graph illustrating the optical intensity loss per intersection as the function of the intersecting angle when the core width of the waveguide is 12 μm and the intersection spacing is 1000 μm. It shows that the loss becomes minimum at the intersecting angle of 90 degrees, and it is 0.015 dB per intersection. For this reason, the waveguide layout of the present embodiment is designed such that the intersecting angle of the connecting waveguides becomes 90 degrees as shown in FIG. 10.

When N=100 in the present embodiment of the N×N cyclic optical multi/demultiplexer, the number of the intersections of the connecting waveguides is 99 at the maximum. When the core width at the intersecting section is set at 5 μm as in the conventional example, since the intersection loss per intersection is 0.051 dB, the maximum loss becomes 5.1 dB. In contrast, since the intersection loss per intersection is 0.015 dB in the present embodiment, the maximum loss becomes 1.5 dB. Thus, it is obvious that the present embodiment can reduce the maximum intersection loss and the intersection loss differences between the ports.

Figure 12:
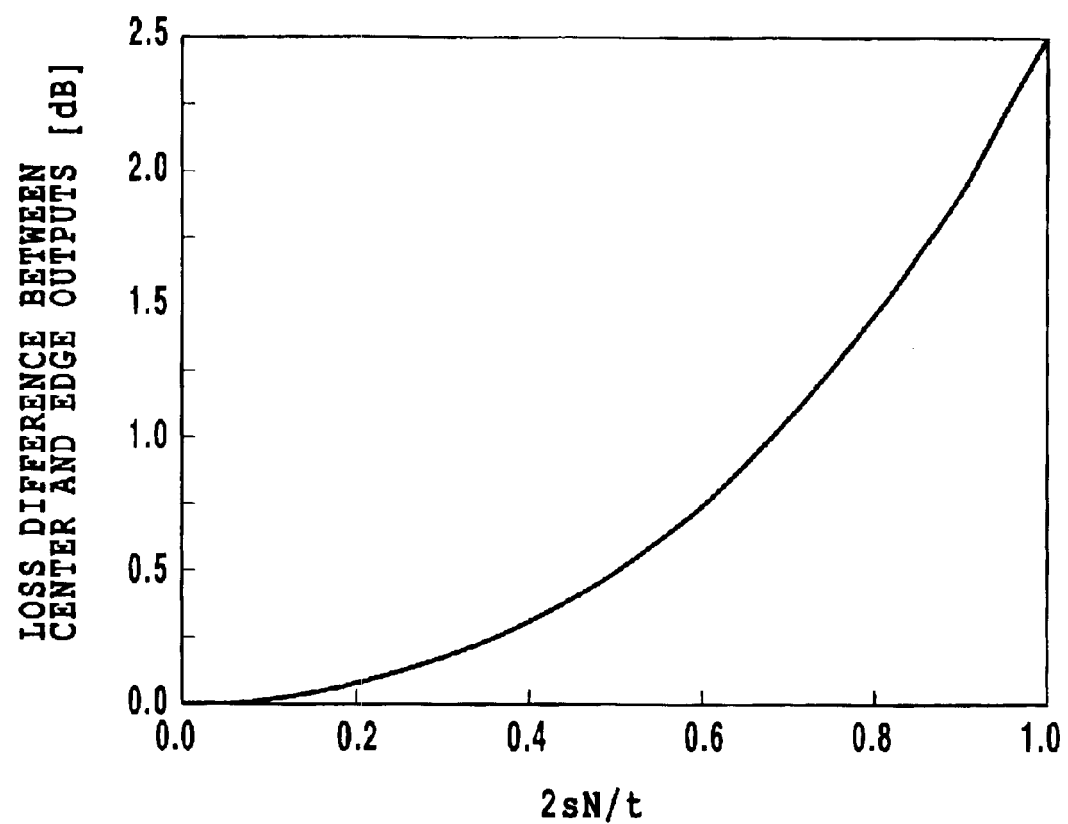
FIG. 12 is a graph illustrating the FSR dependence of the loss difference between central and edge outputs of an AWG.

Furthermore, the loss difference between the output of the central output waveguide and that of the edge output waveguide of the N×2N AWG 42 depends on 2sN/t as illustrated in FIG. 12, where s [nm] is the bandwidth used by the multi/demultiplexed wavelengths of the N×2N AWG, and t [nm] is the free spectral range (FSR) of the N×2N AWG. As is seen from FIG. 12, when the FSR t is made minimum t=2sN, the loss difference becomes about 2.5 dB, and the loss difference reduces with an increase of the FSR.

As is seen from the configuration of FIG. 10, the number of the intersections of the connecting waveguide connected to the ith output waveguide of the N×2N AWG 42 of the N×N cyclic optical multi/demultiplexer is i−1when i≦N and 2N−i when i≧N. Accordingly, the number of the intersections is maximum at the connecting waveguide connected to the central output waveguide of the N×2N AWG 42, and is minimum at the connecting waveguide connected to the edge output waveguide. Thus, the losses of the individual output ports of the N×N cyclic wavelength multi/demultiplexer can be made uniform by designing the FSR such that the loss difference between the central and edge outputs of the N×2N AWG 42 cancels out the intersection loss difference between the connecting waveguides connected to the central and edge output waveguides.

Figure 13:
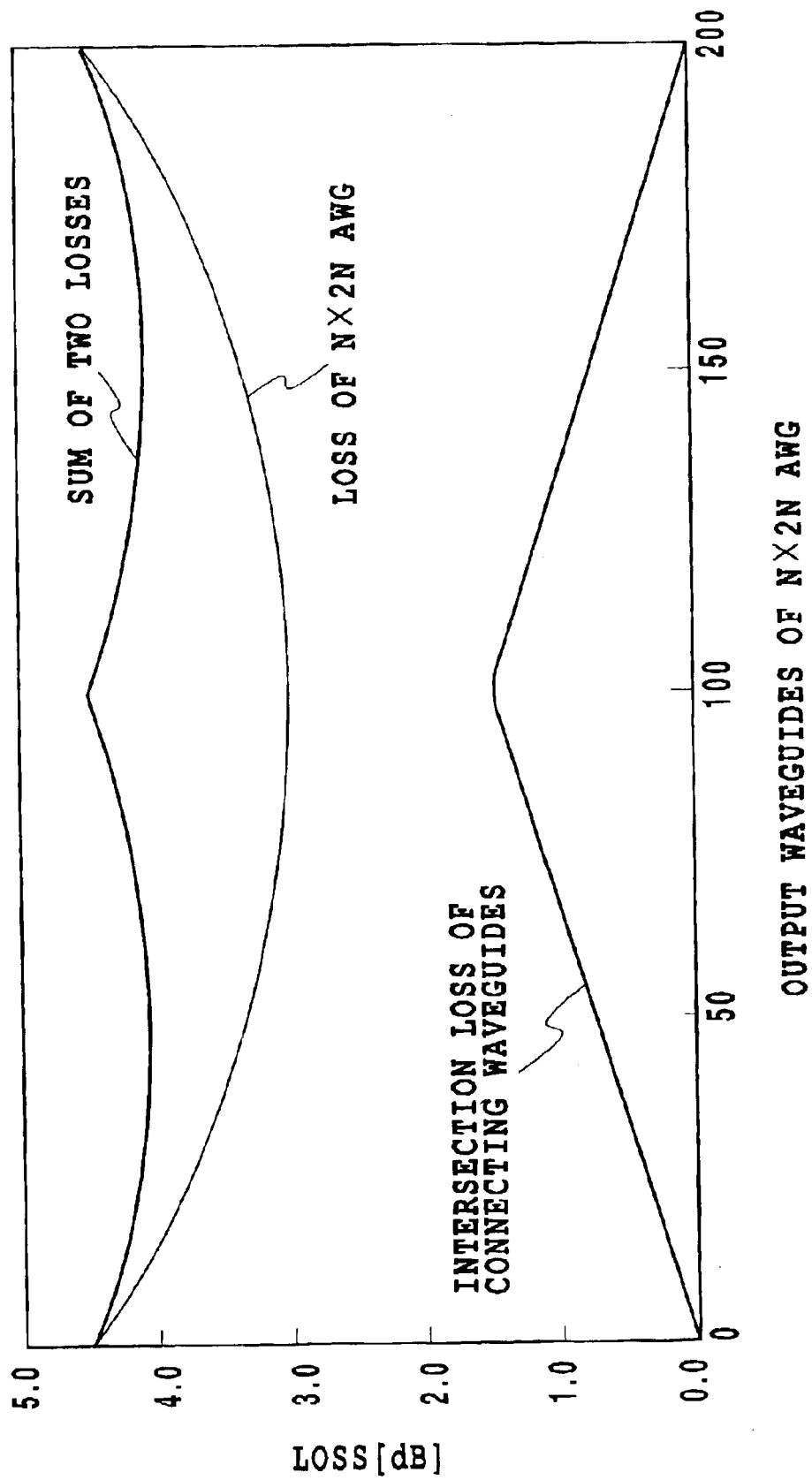
FIG. 13 is a graph illustrating a loss distribution of outputs of the AWG and an intersection loss distribution of the connecting waveguides in an N×N cyclic optical multi/demultiplexer, the third embodiment in accordance with the present invention.

FIG. 13 illustrates the loss distribution of the individual outputs of the N×2N AWG 42, the intersection loss distribution of the connecting waveguides connected to them, and the sum of the two losses when N=100 in the present embodiment of the N×N cyclic wavelength multi/demultiplexer. In the present embodiment, the FSR of the N×2N AWG 42 is set at t=1.23×2sN. In this case, the loss of the central output of the N×2N AWG 42 is 3.0 dB and the loss of the edge output is 4.5 dB as illustrated in FIG. 13, thereby giving the loss difference of 1.5 dB. On the other hand, as for the intersection loss of the connecting waveguide, since it is 0.015 dB per intersection, it takes a maximum value 1.5 dB at the connecting waveguide connected to the central output waveguide of the N×2N AWG 42, and becomes zero at the connecting waveguides connected to the edge output waveguides because they have no intersection.

Therefore the loss distribution of the losses of the N×2N AWG 42 plus the losses of the connecting waveguides is placed within 4.0–4.5 dB as illustrated in FIG. 13, making it possible to limit the loss deviation below 0.5 dB. The loss difference between the input waveguides of the N×2N AWG 42, and the loss difference between the individual optical couplers are rather small. Thus, the present invention, making uniform the losses of the individual output ports of the N×N cyclic wavelength multi/demultiplexer within 0.5 dB, can implement the low loss N×N cyclic wavelength multi/demultiplexer with uniform loss.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical waveguide circuit including a first optical waveguide comprising a cladding and a core, and a set of second optical waveguides comprising a plurality of optical waveguides, which each comprise a cladding and a core, and intersect with the first optical waveguide successively, said first optical waveguide comprising:

an intersecting section at which said first optical waveguide intersect with said set of the second optical waveguides;

a tapered section at which a core width is varied before and after said intersecting section; and an input terminal section and an output terminal section for inputting and outputting lightwave, wherein at least one of a core width and a core height of said intersecting section differs from corresponding one of a core width and a core height of said input and output terminal sections, and wherein a core width of said tapered section varies smoothly between said intersecting section and said input and output sections, and wherein the individual waveguides included in said set of the second optical waveguides intersect with said first optical waveguide at a fixed interval.

2. The optical waveguide circuit as claimed in claim 1, wherein said intersecting section in said first optical waveguide comprises of a straight waveguide.

3. The optical waveguide circuit as claimed in claim 2, wherein said first optical waveguides and said set of the second optical waveguides are arranged such that said first optical waveguides and at least part of the waveguides included in said set of the second optical waveguides intersect with each other perpendicularly.

4. The optical waveguide circuit as claimed in claim 2, wherein said claddings and said cores comprise silica-based glass.

5. The optical waveguide circuit as claimed in claim 1, wherein said first optical waveguides and said set of the second optical waveguides are arranged such that said first optical waveguides and at least part of the waveguides included in said set of the second optical waveguides intersect with each other perpendicularly.

6. The optical waveguide circuit as claimed in claim 1, wherein said claddings and said cores comprise silica-based glass.

7. An optical waveguide circuit with optical waveguides each comprising a cladding and a core and including an arrayed-waveguide grating having a given number of input optical waveguides and a plurality of output optical waveguides; first optical waveguides each connected to one of the plurality of output optical waveguides; and a set of second optical waveguides comprising a plurality of optical waveguides, which comprise a cladding and a core, and intersect the first optical waveguides successively, each of said first optical waveguides comprising:

an intersecting section at which each of said first optical waveguides intersect said set of the second optical waveguides;

a tapered section at which a core width is varied before and after said intersecting section; and an input terminal section and an output terminal section for inputting and outputting lightwave, wherein at least one of a core width and a core height of said intersecting section differs from corresponding one of a core width and a core height of said input and output terminal sections, and wherein at least one of core width and core height of said tapered section varies smoothly between said intersecting section and said input and output sections, and wherein the individual waveguides included in said set of the second optical waveguides intersect with said first optical waveguides at a fixed interval.

8. An optical waveguide circuit with optical waveguides each comprising a cladding and a core and including an arrayed-waveguide grating having a given number of input optical waveguides and a plurality of output optical waveguides; first optical waveguides each connected to one of the plurality of output optical waveguides; and a set of second optical waveguides comprising a plurality of optical waveguides, which each comprise a cladding and a core, and intersect the first optical waveguides successively, each of said first optical waveguides comprising:

an intersecting section at which each of said first optical waveguides intersect said set of the second optical waveguides;

a tapered section at which a core width is varied before and after said intersecting section; and an input terminal section and an output terminal section for inputting and outputting lightwave, wherein at least one of a core width and a core height of said intersecting section differs from corresponding one of a core width and a core height of said input and output terminal sections; and at least one of core width and core height of said tapered section varies smoothly between said intersecting section and said input and output sections, and wherein said arrayed-waveguide grating consists of an N×2N arrayed-waveguide grating having N input waveguides and 2N output waveguides, where N is an integer greater than one; said first optical waveguides have their one end connected to Lth waveguides of said output waveguides, where L=2, 3, . . . , and N; and individual waveguides of said set of the second optical waveguides have their one ends connected to (N+1)th to (N+L−1)th waveguides of said output waveguides, wherein said optical waveguide circuit further comprises M optical couplers, an Mth optical coupler of which has its inputs connected to an Mth and (M+N)th waveguides of said output waveguides to couple the pair of the waveguides, where M=1, 2, . . . , and N, and wherein said input waveguides constitute input ports, and outputs of said couplers constitute output ports.

9. The optical waveguide circuit as claimed in claim 8, wherein said intersecting section in each of said first optical waveguides comprises of a straight waveguide.

10. The optical waveguide circuit as claimed in claim 9, wherein the individual waveguides included in said set of the second optical waveguides intersect with said first optical waveguides at a fixed interval.

11. The optical waveguide circuit as claimed in claim 9, wherein said first optical waveguides and said set of the second optical waveguides are arranged such that said first optical waveguides and at least part of the waveguides included in said set of the second optical waveguides intersect with each other perpendicularly.

12. The optical waveguide circuit as claimed in claim 9, wherein a free spectral range of said N×2N arrayed-waveguide grating is set such that a maximum optical loss of said first optical waveguides originating with the intersections with said set of the second optical waveguides becomes substantially equal to a maximum difference of optical loss among said output waveguides of said N×2N arrayed-waveguide grating.

13. The optical waveguide circuit as claimed in claim 9, wherein said claddings and said cores comprise silica-based glass.

14. The optical waveguide circuit as claimed in claim 8, wherein a free spectral range of said N×2N arrayed-waveguide grating is set such that a maximum optical loss of said first optical waveguides originating with the intersections with said set of the second optical waveguides becomes substantially equal to a maximum difference of optical loss among said output waveguides of said N×2N arrayed-waveguide grating.

15. The optical waveguide circuit as claimed in claim 14, wherein the individual waveguides included in said set of the second optical waveguides intersect with said first optical waveguides at a fixed interval.

16. The optical waveguide circuit as claimed in claim 14, wherein said first optical waveguides and said set of the second optical waveguides are arranged such that said first optical waveguides and at least part of the waveguides included in said set of the second optical waveguides intersect with each other perpendicularly.

17. The optical waveguide circuit as claimed in claim 14, wherein said claddings and said cores comprise silica-based glass.

18. The optical waveguide circuit as claimed in claim 7, wherein said arrayed-waveguide grating comprises an N×2N arrayed-waveguide grating having N input waveguides and 2N output waveguides, where N is an integer greater than one; said first optical waveguides have their one end connected to Lth waveguides of said output waveguides, where L=N+1, N+2, . . . , and 2N−1; and individual waveguides of said set of the second optical waveguides have their one ends connected to (L−N+1)th to Nth waveguides of said output waveguides, wherein said optical waveguide circuit further comprises M optical couplers, an Mth optical coupler of which has its inputs connected to an Mth and (M+N)th waveguides of said output waveguides to couple the pair of the waveguides, where M=1, 2, . . . , and N, and wherein said input waveguides constitute input ports, and outputs of said couplers constitute output ports.

19. The optical waveguide circuit as claimed in claim 18, wherein said intersecting section in each of said first optical waveguides comprises a straight waveguide.

20. The optical waveguide circuit as claimed in claim 19, wherein said first optical waveguides and said set of the second optical waveguides are arranged such that said first optical waveguides and at least part of the waveguides included in said set of the second optical waveguides intersect with each other perpendicularly.

21. The optical waveguide circuit as claimed in claim 19, wherein a free spectral range of said N×2N arrayed-waveguide grating is set such that a maximum optical loss of said first optical waveguides originating with the intersections with said set of the second optical waveguides becomes substantially equal to a maximum difference of optical loss among said output waveguides of said N×2N arrayed-waveguide grating.

22. The optical waveguide circuit as claimed in claim 19, wherein said claddings and said cores comprise silica-based glass.

23. The optical waveguide circuit as claimed in claim 18, wherein a free spectral range of said N×2N arrayed-waveguide grating is set such that a maximum optical loss of said first optical waveguides originating with the intersections with said set of the second optical waveguides becomes substantially equal to a maximum difference of optical loss among said output waveguides of said N×2N arrayed-waveguide grating.

24. The optical waveguide circuit as claimed in claim 23, wherein said first optical waveguides and said set of the second optical waveguides are arranged such that said first optical waveguides and at least part of the waveguides included in said set of the second optical waveguides intersect with each other perpendicularly.

25. The optical waveguide circuit as claimed in claim 23, wherein said claddings and said cores comprise silica-based glass.

26. The optical waveguide circuit as claimed in claim 7, wherein said intersecting section in each of said first optical waveguides comprises a straight waveguide.

27. The optical waveguide circuit as claimed in claim 26, wherein said first optical waveguides and said set of the second optical waveguides are arranged such that said first optical waveguides and at least part of the waveguides included in said set of the second optical waveguides intersect with each other perpendicularly.

28. The optical waveguide circuit as claimed in claim 26, wherein a free spectral range of said arrayed-waveguide grating is set such that a maximum optical loss of said first optical waveguides originating with the intersections with said set of the second optical waveguides becomes substantially equal to a maximum difference of optical loss among said output waveguides of said arrayed-waveguide grating.

29. The optical waveguide circuit as claimed in claim 26, wherein said claddings and said cores comprise of silica-based glass.

30. The optical waveguide circuit as claimed in claim 7, wherein a free spectral range of said arrayed-waveguide grating is set such that a maximum optical loss of said first optical waveguides originating with the intersections with said set of the second optical waveguides becomes substantially equal to a maximum difference of optical loss among said output waveguides of said arrayed-waveguide grating.

31. The optical waveguide circuit as claimed in claim 30, wherein said first optical waveguides and said set of the second optical waveguides are arranged such that said first optical waveguides and at least part of the waveguides included in said set of the second optical waveguides intersect with each other perpendicularly.

32. The optical waveguide circuit as claimed in claim 30, wherein said claddings and said cores comprise silica-based glass.

33. The optical waveguide circuit as claimed in claim 7, wherein said first optical waveguides and said set of the second optical waveguides are arranged such that said first optical waveguides and at least part of the waveguides included in said set of the second optical waveguides intersect with each other perpendicularly.

34. The optical waveguide circuit as claimed in claim 7, wherein said claddings and said cores comprise silica-based glass.

* * * * *